United States Patent [19]
Dischert

[11] 4,190,864
[45] Feb. 26, 1980

[54] REMOTE IRIS CONTROL FOR TELEVISION CAMERAS

[75] Inventor: Robert A. Dischert, Burlington, N.J.

[73] Assignee: RCA Corporation, New York, N.Y.

[21] Appl. No.: 944,339

[22] Filed: Sep. 21, 1978

[51] Int. Cl.² .............................................. H04N 5/30
[52] U.S. Cl. .................................... 358/210; 358/228
[58] Field of Search ................ 358/210, 228; 352/141

[56] References Cited
U.S. PATENT DOCUMENTS

| 2,898,536 | 8/1959 | Musolf | 318/290 |
|---|---|---|---|
| 3,571,495 | 3/1971 | Konings | 358/228 X |
| 4,037,254 | 7/1977 | Monahan | 358/228 |

FOREIGN PATENT DOCUMENTS 1925815  12/1970  Fed. Rep. of Germany ........... 358/210

*Primary Examiner*—Robert L. Richardson
*Attorney, Agent, or Firm*—Eugene M. Whitacre; Paul J. Rasmussen; Robert L. Troike

[57] ABSTRACT

The extreme up and down positions of an iris control generate special binary digital codes. There special codes when decoded cause an up-down counter to be responsive to clock pulses and corresponding count up or down. The output of the counter is converted to an analog voltage which in turn controls the position of a camera iris. The iris opening is changed at a constant ranging rate determined by the clock when the lever is in the extreme positions. When the lever is between these extreme positions the iris is no longer changing at a constant ranging rate but rather is directly selected by the position of the lever.

3 Claims, 1 Drawing Figure

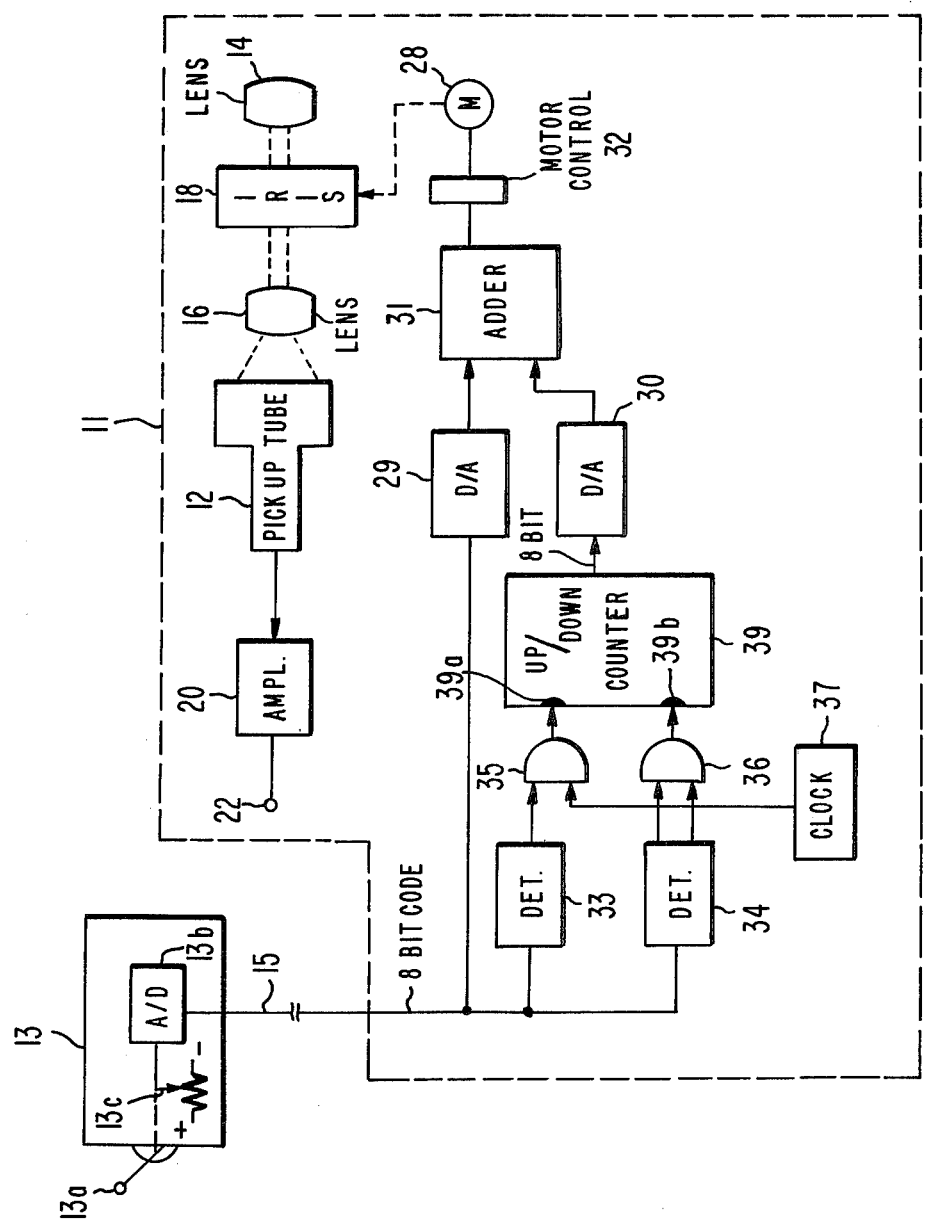

REMOTE IRIS CONTROL FOR TELEVISION CAMERAS

BACKGROUND OF THE INVENTION

The present invention relates to the art of remote light admittance control for television cameras and more particularly to an automatic ranging iris control. A televised scene may vary widely in the average level of illumination. The imaging tubes used for television cameras cannot respond to such wide variations of light levels and some means must be provided to regulate the amount of light reaching the tube from the scenes.

A motor driven iris is commonly provided in the cameras with some control means for controlling the iris. It is desirable that this iris control be manually controlled from a remote location. It is desirable from the standpoint of the operator that this remote control be a single lever type control.

Because of the required wide range of the iris, a separate ranging switch is normally used to select the range in which the iris control will operate. This is to provide the operator with a control with adequate resolution to control the iris with accuracy.

In the newer cameras it is desirable to use a digital remote control system for all controls. In an effort to reduce the amount of structure it is desirable to limit the code to, for example, a single eight-bit code. This presents a problem when more than a eight-bit code is necessary to provide the desired resolution.

SUMMARY OF THE INVENTION

Briefly, a digital light admittance control system for use with television cameras having, for example, a motor driven iris is provided by a manually adjustable control device having first and second limit positions and positions therebetween. A converter converts the control device positions to binary digital code signals. A fine control system is responsive to the binary coded signals from the positions other than the limit positions for directly controlling in relatively small increments the opening of the iris within a relatively narrow range of the required total iris opening range. A coarse control subsystem is responsive binary coded signals representing the limit positions for opening or closing the iris at a constant rate for positioning the iris opening in the desired range the fine control will operate.

DESCRIPTION OF THE DRAWING

The single FIGURE is a block diagram of a digital automatic ranging and control system according to the present invention.

DESCRIPTION OF PREFERRED EMBODIMENT

Referring to FIG. 1 there is shown a camera 11 and a remote control unit 13 and a transmission line 15 therebetween. This transmission line may be a coaxial cable. Light from an object to be televised is projected onto the photosensitive target of the pickup tube 12 by means of an optical system represented by a pair of condensing object lenses 14 and 16. The amount of light from the object that is projected into the photosensitive target of the pickup tube 12 is controlled by means of an iris diaphram 18.

The output video signal from the pickup tube 12 is amplified by amplifier 20 and made available at output terminal 22 for application to the remainder of the television signal transmission system. A reversible electric motor 28 is mechanically coupled to the iris 18 for opening and closing the diaphram in proportion to analog signal levels applied thereto. Voltage to the motor control 32 and hence to the motor 28 is selected by the remote control 13. The motor control 32 is responsive to an increase in analog voltage for example for causing the motor 28 to rotate in one direction to open the iris and to a decrease in voltage for causing the motor 28 to rotate in the opposite direction to proportionately close the iris.

Referring to remote control 13, the manual control of the iris is provided by a lever 13a. The lever 13a, for example, may be coupled via a mechanical linkage to a potentiometer 13c wherein by moving the lever up and down the potentiometer moves toward the plus and minus voltage supply terminals respectively. These voltages are coupled to an A to D (analog to digital) converter 13b. The A to D converter 13b converts the selected analog voltages to a parallel eight-bit digital code representing the selected analog voltage. This digital code is coupled via transmission line 15 to the camera 11. By the movement of the lever 13a a voltage proportional to position of the lever is provided to the A to D converter 13b and this voltage when converted to an eight-bit code provides 256 possible voltage levels. The code with all logic "0" levels represents when the lever is in the fully down position and the code with all logic "1" levels represents the lever in fully up position. These fully down and fully up levels are utilized for positioning the iris opening in the range the direct lever control will operate as will be described later.

In the camera 11, the transmission line 15 is coupled to a D to A (digital to analog) converter 29 and to detectors 33 and 34. The detector 33 detects when the digital word is at a maximum level (all logic "1" for example-the lever full-up position) and detector 34 detects minimum level (all logic "0" level-the lever full-down position). Detector 33 therefore detects when the lever 13a is in the full up position of travel and detector 34 detects when the lever 13a is in the full down position of travel. The output of detector 33 is coupled to an AND gate 35 and the output of the detector 34 is coupled to an AND gate 36. A clock pulse generator 37 which sends clock pulses at a constant rate enables AND gates 35 and 36. The output of AND gate 35 is applied to the counting up terminal 39a of up-down counter 39 and the output of AND gate 36 is coupled to the down counting gate terminal 39b of up-down counter 39. The output from the up-down counter 39 is coupled to a D to A (digital to analog) converter 30 which provides analog voltage corresponding to the code stored in the counter 39. All of the eight-bit code signals on line 15 are coupled to a second D to A converter 29 which converts the eight-bit code signals to analog voltages. The analog voltages from D to A converters 29 and 30 are coupled to adder 31 and these voltages are applied to the motor control 32 to thereby control the motor 28 and the iris 18. When the lever 13a is between the extreme directions of travel the motor 28 is controlled directly by the eight-bit code via the D to A converter 29 to adder 31 to motor control 32. When the lever 13a for example is in extreme upward direction of travel the detector 33 detects this all logic "1" code of the eight-bit code and the clock pulses from clock 37 cause the up-down counter to count up at a constant rate (determined by the clock 37) causing the output of the D to A converter 30 to increase at constant ranging rate and the motor to open the iris at a constant ranging rate for example. When the lever 13a is in the bottom-most direction of travel, detector 34 detects this eight-bit code of all zero levels and provides a control signal to AND gate 36 which is enabled by the clock pulses 37 to cause the up-down counter 39 to count down at a constant rate and decrease the output level from the D to A converter 30 at a constant ranging rate and via the motor control 32 cause the motor to reverse and close the iris for example at a constant ranging rate. The last analog level from converter 30 remains when the lever 13a is no longer at the extreme positions since this level is stored in the counter 39. The output from the D to A converter 30 is added to the control voltage of the D to A converter 29 at adder 31. This causes the range of the voltage that is directly controlled by the D to A converter 29 (fine control) to be shifted by the static voltage from the D to A converter 30 (coarse control). This system allows an operator to quickly readjust the range of the fine iris control by moving the lever to extreme directions.

For example, the camera may have a total required range of aperture openings from f1.4 through f16. The eight-bit code and the travel distance of the lever may be able to directly control only a range from f2 to f4 because of the desired resolution within the range. The f-stops above and below this narrow range is provided by the automatic ranging system described herein by moving the lever for example to full up position the iris opening is increased at a rate determined by the clock from f4 toward f16. Once the operator determines that the iris opening is within the range controllable by the lever in the fine control made he moves the lever from the end stop or limit position and selects the fine control. The new range may then be from f5.6 to f11. Similarly when the lever is in the full down position the iris opening would decrease at a rate determined by the clock toward f1.4. In the system described the range controlled by the lever between end stops is determined by the voltage from converter 30 which is controlled by counter 39. While the above system describes the detectors 33 and 34 as being responsive to the specific code of all logic "1" or all logic "0". The system may preferably be arranged to respond to logic codes close to the extreme positions to produce ranging.

What is claimed is:

1. A digital control system for use with a camera having an electronically controllable light admitting means such as a motor driven iris, comprising:
    a manually adjustable control device having first and second limit positions and positions therebetween,
    converting means coupled to said control device for providing binary coded signals representing the manually selected position of said device,
    fine control means coupled to said converting means and said electronically controllable light admitting means and responsive to said binary coded signals representing positions between said limit positions for directly controlling in relatively small increments the opening of the iris within a relatively narrow range of the required total iris opening range, and
    coarse control means coupled to said converting means and said electronically controllable light admitting means and responsive to binary coded signals representing said control device at substantially said first limit position for opening the iris at a constant rate and responsive to binary coded signals representing said control device at substantially said second limit position for closing the iris at a constant rate to thereby position the iris opening in the desired range said fine control means will operate.

2. The combination of claim 1 wherein said coarse control means includes an up-down counter and a clock generator for applying clocking signals to said counter.

3. A digital iris remote control system for remotely controlling a television camera having an electronically controllable light admitting means such as a motor driven iris comprising:
    a manually adjustable control device remotely located from said camera having first and second limit positions and positions therebetween,
    converting means at said remote location coupled to said device for providing binary coded signals representing a manually selected position of said device,
    a fine control means located at said camera and coupled to said light admitting means and responsive to said binary coded signals representing positions between said limit positions for directly changing in relatively small increments the iris opening within a relatively narrow range of the required total iris opening range,
    a coarse control means located at said camera and coupled to the light admitting means and responsive to said binary coded signal representing said control device at substantially a first of said limit positions for opening said iris at a constant rate and responsive to said binary coded signal representing said control device at substantially the other of said limit positions for closing said iris at a constant rate to thereby position the iris opening in the desired range said fine control means will operate, and
    means including a transmission line coupled between said converting means and said coarse control means and said fine control means for coupling said binary digital control signals from said remote location to said camera location.

* * * * *